United States Patent
Conrad et al.

(10) Patent No.: US 8,934,747 B2
(45) Date of Patent: Jan. 13, 2015

(54) MICROMODULE CABLES AND BREAKOUT CABLES THEREFOR

(71) Applicant: Corning Cable Systems LLC, Hickory, NC (US)

(72) Inventors: Craig Miller Conrad, Hickory, NC (US); William Carl Hurley, Hickory, NC (US); David Henry Smith, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 14/050,903

(22) Filed: Oct. 10, 2013

(65) Prior Publication Data

US 2014/0037256 A1    Feb. 6, 2014

Related U.S. Application Data

(63) Continuation of application No. 12/705,739, filed on Feb. 15, 2010, now Pat. No. 8,582,941.

(60) Provisional application No. 61/152,860, filed on Feb. 16, 2009.

(51) Int. Cl.
  *G02B 6/44*     (2006.01)
  *G02B 6/036*    (2006.01)

(52) U.S. Cl.
  CPC ............ *G02B 6/4401* (2013.01); *G02B 6/0365* (2013.01); *G02B 6/4411* (2013.01)
  USPC ............................ 385/113; 385/128; 385/110

(58) Field of Classification Search
  USPC ................................................ 385/110, 128
  See application file for complete search history.

(56) References Cited

U.S. PATENT DOCUMENTS

| | | | | |
|---|---|---|---|---|
| 5,148,509 | A |   | 9/1992  | Kannabiran ................... 385/109 |
| 5,210,812 | A | * | 5/1993  | Nilsson et al. ................ 385/100 |
| 5,360,497 | A |   | 11/1994 | Schneider et al. .............. 156/47 |
| 5,440,665 | A | * | 8/1995  | Ray et al. ....................... 385/135 |

(Continued)

FOREIGN PATENT DOCUMENTS

| | | | |
|---|---|---|---|
| DE | 19602117 | 7/1997  | ............... G02B 6/44 |
| DE | 19712253 | 10/1998 | ............... G02B 6/44 |

(Continued)

OTHER PUBLICATIONS

European Patent Office, European Search Report for European Application No. 10153724.9, Jun. 10, 2010, 3 pages.

*Primary Examiner* — Kaveh Kianni

(57) ABSTRACT

A breakout cable includes a polymer jacket and a plurality of micromodules enclosed within the jacket. Each micromodule has a plurality of bend resistant optical fibers and a polymer sheath comprising PVC surrounding the bend resistant optical fibers. Each of the plurality of bend resistant optical fibers is a multimode optical fiber including a glass cladding region surrounding and directly adjacent to a glass core region. The core region is a graded-index glass core region, where the refractive index of the core region has a profile having a parabolic or substantially curved shape. The cladding includes a first annular portion having a lesser refractive index relative to a second annular portion of the cladding. The first annular portion is interior to the second annular portion. The cladding is surrounded by a low modulus primary coating and a high modulus secondary coating.

7 Claims, 8 Drawing Sheets

(56) References Cited

U.S. PATENT DOCUMENTS

| | | | |
|---|---|---|---|
| 5,528,718 A * | 6/1996 | Ray et al. | 385/136 |
| 5,568,576 A * | 10/1996 | Takai et al. | 385/24 |
| 5,715,339 A * | 2/1998 | Takai et al. | 385/24 |
| 5,748,823 A * | 5/1998 | Nave | 385/113 |
| 5,822,485 A | 10/1998 | Nelson et al. | 385/112 |
| 5,997,186 A * | 12/1999 | Huynh et al. | 385/99 |
| 6,026,208 A | 2/2000 | Will et al. | 385/128 |
| 6,775,443 B2 | 8/2004 | Bringuier et al. | 385/102 |
| 6,775,444 B1 | 8/2004 | Hurley | 385/104 |
| 6,801,695 B2 | 10/2004 | Lanier et al. | 385/100 |
| 6,922,511 B2 | 7/2005 | Rhoney et al. | 385/106 |
| 6,925,235 B2 | 8/2005 | Lanier et al. | 385/100 |
| 7,113,680 B2 | 9/2006 | Hurley et al. | 385/113 |
| 7,158,707 B2 | 1/2007 | Will et al. | 385/128 |
| 7,231,119 B2 | 6/2007 | Rhoney et al. | 385/100 |
| 7,272,282 B1 * | 9/2007 | Seddon et al. | 385/106 |
| 7,272,283 B2 * | 9/2007 | Temple et al. | 385/114 |
| 7,330,621 B2 * | 2/2008 | Elkins et al. | 385/100 |
| 7,397,991 B1 | 7/2008 | Register | 385/102 |
| 7,403,685 B2 * | 7/2008 | Wells | 385/100 |
| 7,590,321 B2 * | 9/2009 | Lu et al. | 385/104 |
| 7,599,590 B2 | 10/2009 | Stöcklein et al. | 385/110 |
| 7,609,925 B2 * | 10/2009 | Gronvall et al. | 385/100 |
| 7,668,427 B2 | 2/2010 | Register | 385/102 |
| 7,742,667 B2 * | 6/2010 | Paschal et al. | 385/109 |
| 7,995,885 B2 | 8/2011 | Register | 385/102 |
| 8,184,934 B2 * | 5/2012 | Keller et al. | 385/109 |
| 2001/0017967 A1 * | 8/2001 | Hirano et al. | 385/123 |
| 2003/0070831 A1 * | 4/2003 | Hudson | 174/113 R |
| 2004/0223699 A1 * | 11/2004 | Melton et al. | 385/53 |
| 2005/0053342 A1 * | 3/2005 | Melton et al. | 385/113 |
| 2005/0111800 A1 * | 5/2005 | Cooke et al. | 385/100 |
| 2005/0265672 A1 * | 12/2005 | Theuerkorn et al. | 385/100 |
| 2006/0153517 A1 * | 7/2006 | Reagan et al. | 385/135 |
| 2006/0193594 A1 * | 8/2006 | Greenwood et al. | 385/147 |
| 2006/0280413 A1 * | 12/2006 | Paschal et al. | 385/112 |
| 2007/0025668 A1 * | 2/2007 | Greenwood et al. | 385/103 |
| 2007/0065084 A1 * | 3/2007 | Prasad et al. | 385/127 |
| 2007/0098339 A1 * | 5/2007 | Bringuier et al. | 385/106 |
| 2007/0104446 A1 * | 5/2007 | Lu et al. | 385/135 |
| 2007/0212005 A1 * | 9/2007 | Lu et al. | 385/100 |
| 2007/0212009 A1 * | 9/2007 | Lu et al. | 385/135 |
| 2007/0263965 A1 * | 11/2007 | Cody et al. | 385/100 |
| 2008/0013898 A1 * | 1/2008 | Wells | 385/96 |
| 2008/0013905 A1 * | 1/2008 | Bookbinder et al. | 385/124 |
| 2008/0089652 A1 * | 4/2008 | Wells | 385/100 |
| 2008/0151254 A1 * | 6/2008 | Sanders et al. | 356/460 |
| 2008/0166094 A1 | 7/2008 | Bookbinder et al. | 385/124 |
| 2008/0175541 A1 * | 7/2008 | Lu et al. | 385/62 |
| 2008/0175542 A1 * | 7/2008 | Lu et al. | 385/62 |
| 2008/0253722 A1 * | 10/2008 | Gronvall et al. | 385/103 |
| 2008/0253729 A1 * | 10/2008 | Gronvall et al. | 385/137 |
| 2008/0298754 A1 | 12/2008 | Wunsch et al. | 385/103 |
| 2009/0136188 A1 * | 5/2009 | Stoecklein et al. | 385/110 |
| 2009/0213552 A1 | 8/2009 | Mauder et al. | 361/709 |
| 2009/0263089 A1 * | 10/2009 | Keller et al. | 385/109 |
| 2009/0310925 A1 * | 12/2009 | Sanders et al. | 385/126 |
| 2010/0239216 A1 * | 9/2010 | Paschal et al. | 385/113 |
| 2010/0290781 A1 * | 11/2010 | Overton et al. | 398/43 |
| 2012/0189258 A1 * | 7/2012 | Overton et al. | 385/124 |

FOREIGN PATENT DOCUMENTS

| | | | |
|---|---|---|---|
| DE | 19910653 | 9/2000 | G02B 6/44 |
| DE | 102004037589 | 3/2006 | G02B 6/44 |
| DE | 102006018536 | 10/2007 | G02B 6/44 |
| EP | 0023154 | 11/1983 | G02B 5/16 |
| EP | 1018662 A2 | 7/2000 | G02B 6/44 |
| EP | 1591814 A1 | 11/2005 | G02B 6/44 |
| WO | WO00/58768 | 10/2000 | G02B 6/44 |
| WO | WO2004/081611 A2 | 9/2004 | |
| WO | WO2006/012864 | 2/2006 | G02B 6/44 |
| WO | WO2007/121950 | 11/2007 | G02B 6/44 |

* cited by examiner

US 8,934,747 B2

MICROMODULE CABLES AND BREAKOUT CABLES THEREFOR

PRIORITY APPLICATIONS

This application is a continuation of U.S. application Ser. No. 12/705,739, filed Feb. 15, 2010, which claims the benefit of U.S. application Ser. No. 61/152,860, filed Feb. 16, 2009, the entire contents of each of which are hereby incorporated by reference as if presented herein.

TECHNICAL FIELD

The present disclosure relates to an optical cable with micromodules and the use of micromodule cables.

BACKGROUND

Micromodule cables are high density optical cables having a number individual micromodules. The micromodules typically include optical fibers arranged in a sheath for transmitting optical data. The micromodules are arranged within the cable jacket. Conventional micromodule cables are capable of transmitting large amounts of data and are typically designed for outdoor applications.

One of the problems in planning data centers is the large number of cables required to transfer data between racks of electronic equipment. The cables may become tightly packed, which restricts cooling air flow in and around the equipment. Micromodule cables have the ability to transmit large amounts of data, but existing micromodule cables lack many properties that render them suitable for applications such as data centers. For example, prior art high density cables have used relatively flimsy subunit materials such as chalk-filled EVA or polyester-based thermoplastic elastomers. The subunits have had wall thicknesses of about 0.1 mm, which provided only minimum protection for the optical fibers. Furcation of these cables required that the subunits be placed within protective furcation legs so that they were robust enough for field use. Existing micromodule cables may also lack the ability to be bent around corners or other tight spaces without undue attenuation of the optical data. Further, conventional micromodule cables may not be designed to pass burn specifications such as plenum-ratings.

SUMMARY

According to one embodiment, a breakout cable comprises a jacket and a plurality of micromodules enclosed within the jacket, each micromodule having a plurality of optical waveguides and a polymer sheath surrounding the waveguides. The polymer sheath has a thickness in the range of 0.2 mm and 0.3 mm. The breakout cable may have exceptionally low attenuation under various test criteria, such as when subjected to a corner bend load of six kilograms, delta attenuation at 850 nm in the cable is less than 0.2 dB. The polymer sheath surrounding the waveguides can allow access to the optical waveguides by hand tearing, while being robust enough so that they can serve as furcation legs. According to one aspect, the polymer sheath has a thickness in the range of 0.2 mm-0.3 mm and still allows for hand access to the optical waveguides.

According to another embodiment, a breakout cable includes a polymer jacket and a plurality of micromodules enclosed within the jacket. Each micromodule has a plurality of bend resistant optical fibers and a polymer sheath comprising PVC surrounding the bend resistant optical fibers. Each of the plurality of bend resistant optical fibers is a multimode optical fiber including a glass cladding region surrounding and directly adjacent to a glass core region. The core region is a graded-index glass core region, where the refractive index of the core region has a profile having a parabolic or substantially curved shape. The cladding includes a first annular portion having a lesser refractive index relative to a second annular portion of the cladding. The first annular portion is interior to the second annular portion. The cladding is surrounded by a low modulus primary coating and a high modulus secondary coating.

According to another embodiment, a plurality of the breakout cables are enclosed within an outer jacket to form a micromodule breakout cable.

According to one aspect, a method of calculating jacket thickness for a cable is used to provide a breakout cable with robustness, compliance with plenum burn requirements, and with hand accessibility. The method determines a maximum jacket thickness based on material modulus.

Those skilled in the art will appreciate the above stated advantages and other advantages and benefits of various additional embodiments reading the following detailed description of the embodiments with reference to the below-listed drawing figures.

BRIEF DESCRIPTION OF THE FIGURES

The present embodiments are explained in more detail below with reference to figures which show the exemplary embodiments.

DETAILED DESCRIPTION

Figure 1:
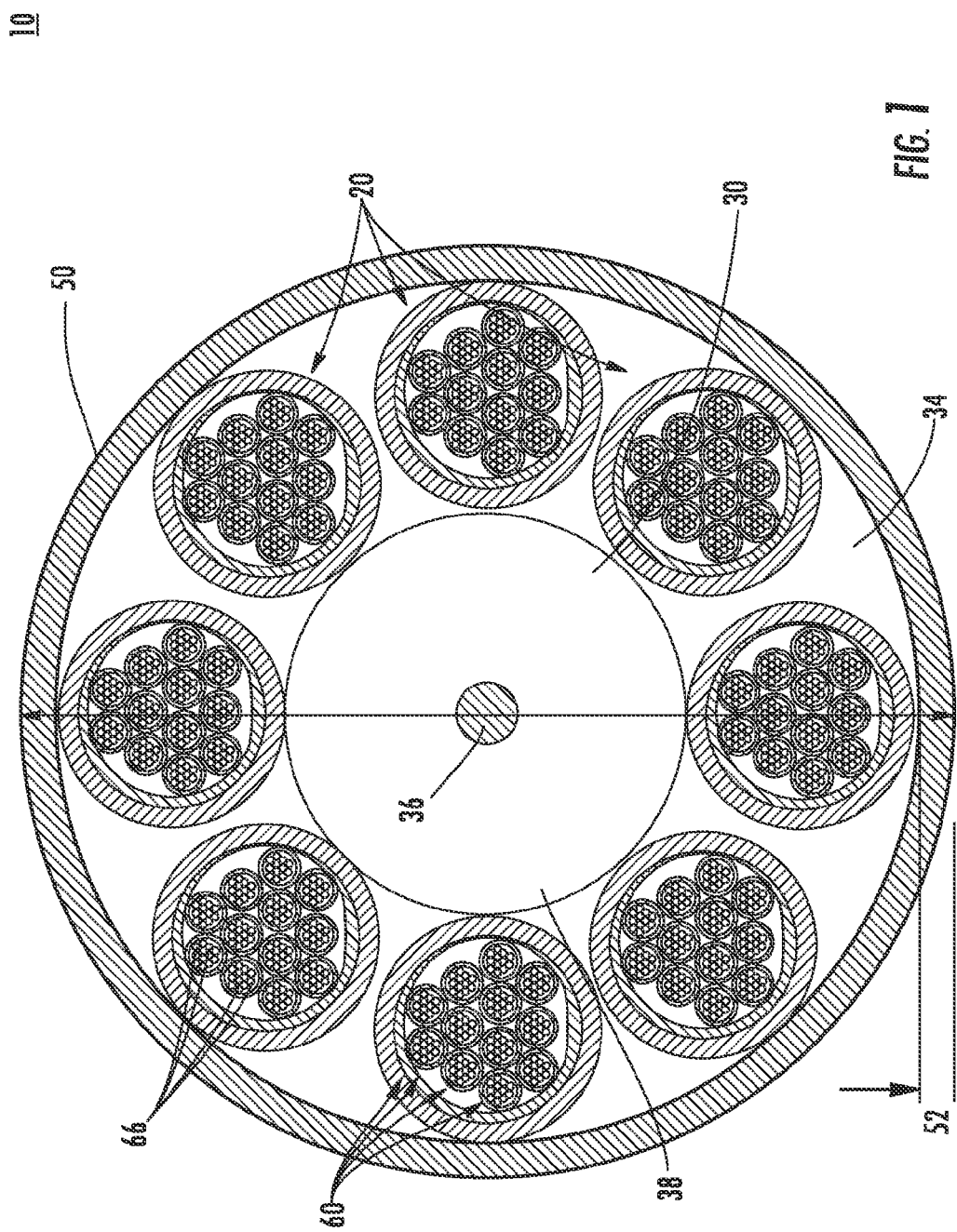
FIG. 1 is a cross section of a micromodule cable according to a first embodiment.

FIG. 1 is a cross section of an optical micromodule cable 10 according to a first embodiment and having a generally circular cross-section. The optical cable 10 comprises a plurality of breakout units or cables 20 arranged (e.g. stranded) around a central member 30 in an interior 34 of the cable 10. The central member 30 can be, for example, a relatively stiff member 36 of fiber or glass-reinforced plastic, or a relatively flexible combination of aramid fiber that may include an overcoating of plastic material 38. The breakout units 20 are enclosed within the cable's outer jacket 50. The outer jacket 50 can be formed from, for example, a polymer material, and may be reinforced with fibers, etc. (not shown), and has a thickness 52. Each breakout unit 20 includes a plurality of micromodule subunits 60, or simply "micromodules", that each contain at least one optical waveguide 66. The exemplary micromodules 60 are not stranded within the breakout units 20, although stranding may be used for certain applications. For example, the micromodules 60 can be twisted in helical fashion with respect to one another, in particular when a plurality of or all of the micromodules 60 are arranged in such a way that they are rotated with a specified lay length.

In the illustrated embodiment, the micromodule breakout cable 10 has eight breakout units 20, each breakout unit 20 having twelve micromodules 60, with each micromodule 60 including twelve optical waveguides 66. The total number of optical waveguides 66 for the cable is therefore 1152. Other numbers of breakout units 20, micromodules 60, and optical waveguides 66 can be employed for various applications, however. The micromodule cable 10, the breakout units 20 and the micromodules 60 all have generally circular cross-sections, although other cross-sections may be used.

Figure 2:
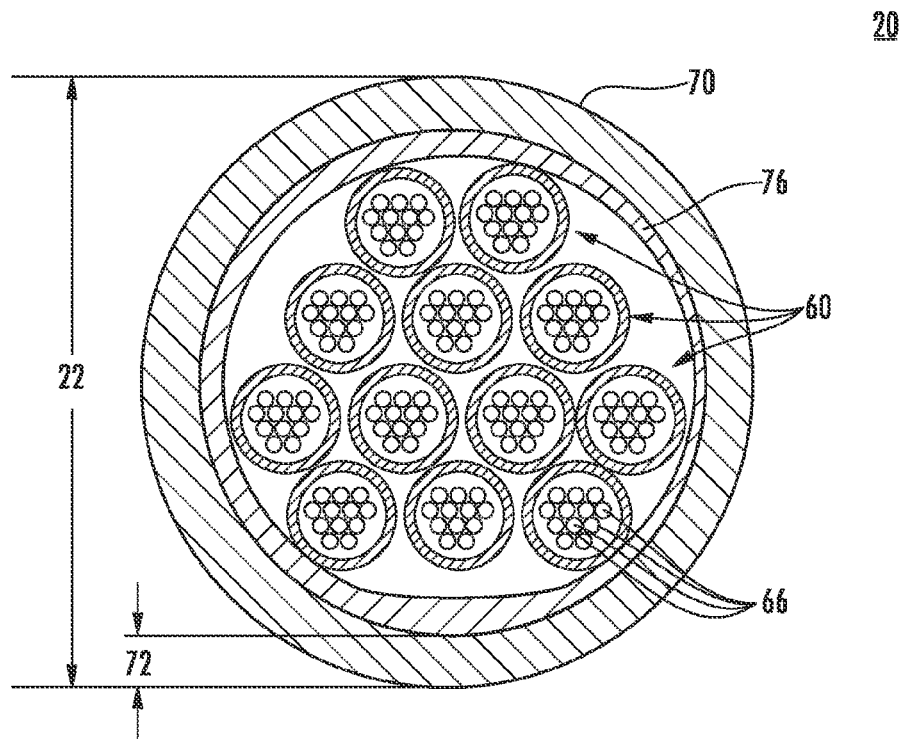
FIG. 2 is a sectional view of a breakout unit or cable of the cable of FIG. 1.

FIG. 2 is a cross section of one of the exemplary breakout units 20 having diameter 22. Each breakout unit 20 has a jacket 70 of thickness 72 that encloses its micromodules 60. The thickness 72 will not be completely uniform and thicknesses, as well as diameters described in this specification refer to nominal or average values. A strain-relief element 76 may be disposed adjacent to the interior of the jacket 70 and surrounding the micromodules 60. The strain-relief element 76 may be, for example, a layer of yarns (e.g. aramid yarn) for absorbing tensile loads on the cable 10. In FIG. 2, the exemplary strain-relief element is 76 are illustrated schematically as a layer of yarn disposed adjacent to the interior of outer jacket 70. The layer of strain-relief element 76 is shown with a non-uniform thickness because the locations of the micromodules 60 may cause the strain-relief element to compress at various locations along the length of the breakout unit 20.

Figure 3:
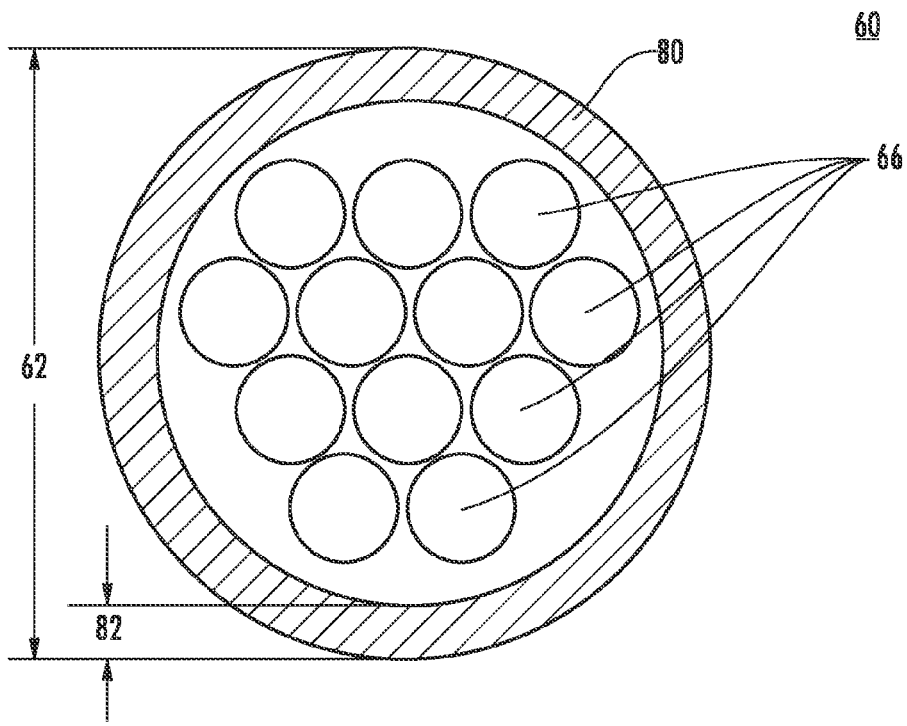
FIG. 3 is a sectional view of a micromodule of the cable of FIG. 1.

FIG. 3 is a cross section of a micromodule subunit 60 having a diameter 62. The optical waveguides 66 of the micromodules 60 are enclosed in a polymeric sheath 80 of thickness 82.

According to one aspect of the first embodiment, the micromodule cable 10 can be constructed to achieve desired properties. For example, the components of the cable 10 can be constructed of selected materials of selected thicknesses such that the cable 10 achieves plenum burn ratings according to desired specifications. The micromodules 60 can also be constructed so that they are relatively robust, such that they are suitable for field use, while also providing a desired degree of accessibility. For example, the micromodules 60 according to the present embodiments can be constructed with thicker sheaths 80, on the order of 0.2 mm or more, which provide sufficient protection for the fibers such that the micromodules 60 may be used as a furcation leg. The cable jacket 50, the breakout unit jackets 70, and the micromodule sheaths 80 can also be formed from fire-retardant materials to obtain a desired plenum burn rating. For example, highly-filled PVC of a specified thicknesses can be used to form the micromodule sheaths 80. One well known plenum burn standard is the National Fire Protection Act Standards (NFPA) 262 burn test. NFPA 262 prescribes the methodology to measure flame travel distance and optical density of smoke for insulated, jacketed, or both, electrical wires and cables and optical fiber cables that are to be installed in plenums and other spaces used to transport environmental air without being enclosed in raceways. Cables according to the present embodiments may also be constructed to be low skew within the micromodules 60 so that they are suitable for use in parallel optic transmission systems. Skew is generally defined as the difference in the time of flight of optical signals for the fibers within a module and has units of picoseconds per meter (ps/m).

Figure 4:
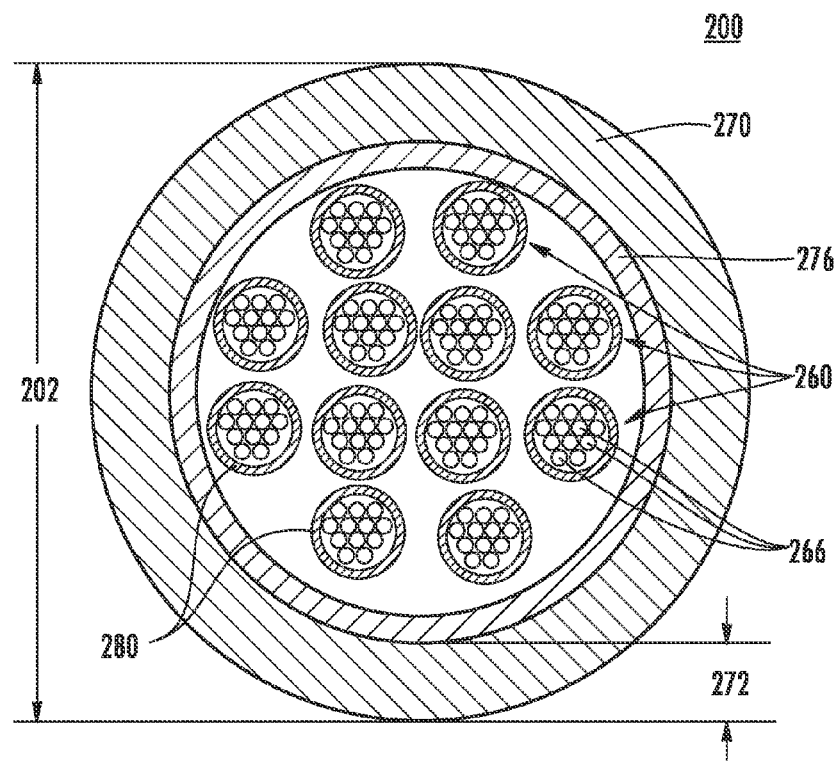
FIG. 4 is a sectional view of a cable according to a second embodiment.

FIG. 4 is a section view of a cable 200 according to a second embodiment having a diameter 202. The cable 200 is generally similar to the breakout units 20 of the cable 10, but the cable 200 may have a jacket 270 of greater thickness 272 than the thickness 72 of the breakout unit jacket 70 to provided added robustness to the cable 200. The interior of the cable 200 may also allow for greater spacing of the micromodules 260. In FIG. 4, elements of like or identical construction to those of FIGS. 1-3 are indicated with like reference numbers, with the elements in FIG. 4 being preceded by a "2." The micromodules 260 illustrated in FIG. 4 may, for example, be identical to the micromodules 60 illustrated in FIGS. 1-3. As in the case of the cable 10, the cable 200 can be constructed to have desirable burn properties as well as a selected degree of durability and hand accessibility. Exemplary methodologies for constructing cables according to the present embodiments are discussed in detail below.

The following discussion is addressed to the components of the cable 200 illustrated in FIG. 4, although the principles discussed herein apply to the cable 10 (FIGS. 1-3). The micromodule sheath 280 thickness 282 may be increased or decreased to adjust the properties of the cable 200. For example, the micromodules 260 may be made with a thicker sheath 280 to make a more robust unit, or it may be made with a thinner sheath wall in order to reduce size and material costs. However, according to the present embodiments, additional constraints may be placed on the materials and dimension of the micromodule sheath 280 thickness. One desirable property is accessibility, or the ability to easily remove the micromodule sheath 80 from around the optical waveguides 66 by simple tearing with the fingers. The axial strength of the micromodule sheath 280 is the cross sectional area of the sheath 280 times the modulus of the material. A plenum grade PVC was tested as the micromodule sheath 280 material having a modulus of 2500 psi with sheath thicknesses of 0.1 mm, 0.2 mm, and 0.3 mm. A sheath 280 thickness of 0.2 mm allowed for easy removal of the sheath 280, but at 0.3 mm it became much more difficult to remove the sheath. A micromodule sheath 280 of thickness in the range of 0.2 mm to 0.3 mm accordingly provides highly desirable properties not available in existing cables. Using these values as design constraints, the maximum sheath thickness for a given material modulus may be calculated using the following Equation 1 (wall thickness in millimeters and modulus in psi):

$$\text{Material\_Modulus} = 590(\text{Wall\_thickness})^{-1.2}.$$

Figure 5:
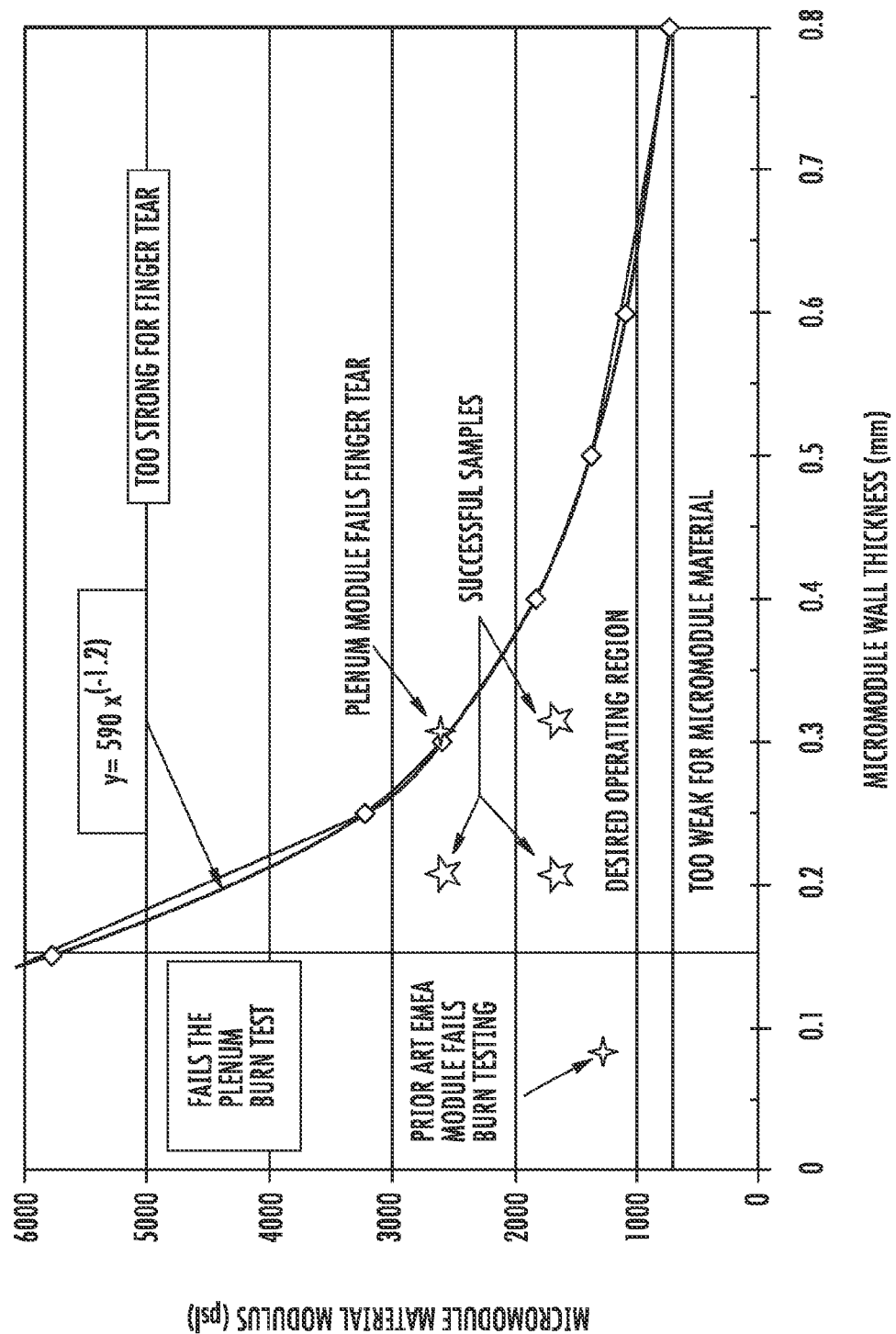
FIG. 5 is a plot illustrating various design constraints in designing a cable for strength, accessibility and for plenum burn characteristics.

The constraints discussed above define a desired operating region. The DESIRED OPERATING REGION is represented on a plot of wall thickness versus modulus as shown in FIG. 5.

The methodologies set forth above may be applied to alternative forms of packaging. Equation 1 establishes a relationship and practical limit for any packaging that is intended for easy opening by hand. For example, it could be used in the design of a vessel accommodating foodstuffs. In FIG. 5, the minimum wall (or sheath) thickness is determined by the plenum burn test; however, for a bag of foodstuffs, the minimum wall thickness can be determined by the minimum thickness to maintain freshness or some other constraint.

Another direct application of Equation 1 is in the design of packaging for emergency medical equipment in which the package must maintain a sterile environment inside but be easily opened by the medical technician during an emergency. Equation 1 can be used to determine the maximum wall thickness, and the minimum wall thickness can be determined by the thickness required to maintain the contents in a sterile environment.

According to another aspect of the present embodiments, the cables 10, 200 may be used in data center applications, such as in a data information transfer system. In data centers, optical signals are transmitted and received in blade servers. Common blade servers have from 16 to 48 optical ports. Each optical port has a transmit fiber and a receive fiber. In parallel optic systems, the transmit fiber would be replaced by 12 fibers and the receive fiber would be replaced by 12 fibers in a 120 Gb/s Ethernet blade server. Thus a parallel optic system with a 48 port blade servers would need 1152 optical fibers. An example cable suitable for use in a data center is described below:

Example 1

According to one example embodiment, a cable 10 as shown in FIG. 1 includes twelve optical waveguides 66, in the form of optical fibers, in each micromodule 60. The micromodule diameter 62 is 1.6 mm. Twelve micromodules 60 are placed together in a 144 fiber breakout unit 20 having a diameter 22 of about 8.6 mm. Eight breakout units 20 are placed together in an 1152 fiber cable that is less than 36 mm in diameter 12.

According to the above example, if desired, the fiber count can be increased to 1728 fibers in a plenum cable of less than 40 mm in diameter by using twelve breakout units stranded in a 9-over-3 pattern.

According to the above embodiments, the cable 200 may comply with NFPA 262 while having a diameter 202 of less than 13.1 mm for a 144 fiber cable. The cables 10, 200 may have low skew for parallel optic systems of less than 2.0 ps/m.

In the above embodiments, low skew may be obtained in the subunits by using OM3 grade or better multimode fibers and precise control of the fiber tension during processing. The maximum allowed difference in fiber tension during processing of the subunit should be less than 50 g in order to achieve a skew less than 0.75 ns in a 300 meter cable assembly. The numerical aperture (NA) of the optical fiber should also be controlled. The fibers for the micromodules can be selected so that the difference in NA for the fibers within a subunit are less than 0.08 to achieve a skew less than 0.75 ns in a 300 m cable assembly.

One exemplary fiber suitable for use in the above cables is a bend resistant multimode optical fibers comprising a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more downdopants such as fluorine, boron, individually or mixtures thereof The depressed-index annular portion may have a refractive index delta less than about −0.2% and a width of at least about 1 micron, said depressed-index annular portion being spaced from said core by at least about 0.5 microns. In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter. The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm. 50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength . These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm. Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm. In some embodiments, the numerical aperture ("NA") of the optical fiber is preferably less than 0.23 and greater than 0.17, more preferably greater than 0.18, and most preferably less than 0.215 and greater than 0.185. In some embodiments, the core extends radially outwardly from the centerline to a radius R1, wherein 10≤R1≤40 microns, more preferably 20≤R1≤40 microns. In some embodiments, 22≤R1≤34 microns. In some preferred embodiments, the outer radius of the core is between about 22 to 28 microns. In some other preferred embodiments, the outer radius of the core is between about 28 to 34 microns. In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%. In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 6:
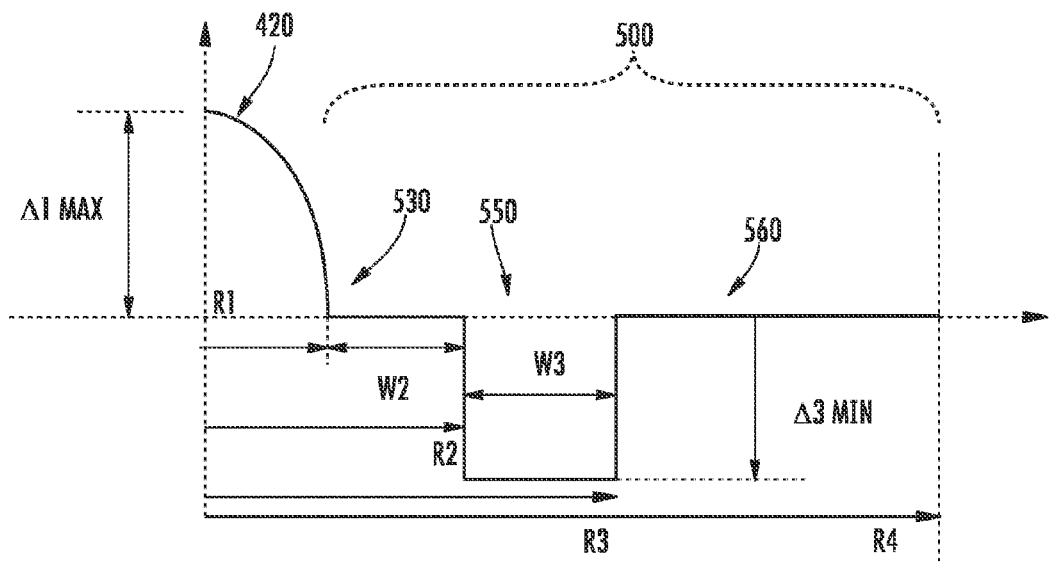
FIG. 6 is a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 7:
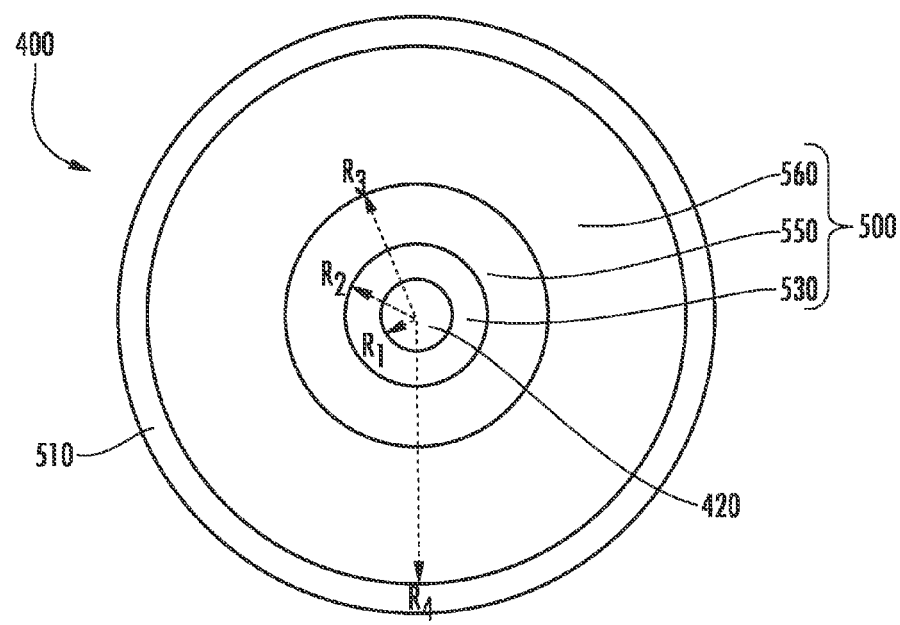
FIG. 7 is a schematic representation (not to scale) of a cross-sectional view of the optical waveguide fiber of FIG. 6.

FIG. 6 is a schematic representation of the refractive index profile of a cross-section of the glass portion of an embodiment of a multimode optical fiber 400 comprising a glass core 420 and a glass cladding 500, the cladding comprising an inner annular portion 530, a depressed-index annular portion 550, and an outer annular portion 560. FIG. 7 is a schematic representation (not to scale) of a cross-sectional view of the optical waveguide fiber of FIG. 6. The core 420 has outer radius R1 and maximum refractive index delta $\Delta 1MAX$. The inner annular portion 530 has width W2 and outer radius R2. Depressed-index annular portion 550 has minimum refractive index delta percent $\Delta 3MIN$, width W3 and outer radius R3. The depressed-index annular portion 550 is shown offset, or spaced away, from the core 420 by the inner annular portion 530. The annular portion 550 surrounds and contacts the inner annular portion 530. The outer annular portion 560 surrounds and contacts the annular portion 550. The clad layer 500 is surrounded by at least one coating 510, which may in some embodiments comprise a low modulus primary coating and a high modulus secondary coating. The inner annular portion 530 has a refractive index profile $\Delta 2(r)$ with a maximum relative refractive index $\Delta 2MAX$, and a minimum relative refractive index $\Delta 2MIN$, where in some embodiments $\Delta 2MAX=\Delta 2MIN$. The depressed-index annular portion 550 has a refractive index profile $\Delta 3(r)$ with a minimum relative refractive index $\Delta 3MIN$. The outer annular portion 560 has a refractive index profile $\Delta 4(r)$ with a maximum relative refractive index $\Delta 4MAX$, and a minimum relative refractive index $\Delta 4MIN$, where in some embodiments $\Delta 4MAX=\Delta 4MIN$. Preferably, $\Delta 1MAX>\Delta 2MAX>\Delta 3MIN$. In some embodiments, the inner annular portion 530 has a substantially constant refractive index profile, as shown in FIG. 6 with a constant $\Delta 2(r)$; in some of these embodiments, $\Delta 2(r)=0\%$. In some embodiments, the outer annular portion 560 has a substantially constant refractive index profile, as shown in FIG. 6 with a constant $\Delta 4(r)$; in some of these embodiments, $\Delta 4(r)=0\%$. The core 420 has an entirely positive refractive index profile, where $\Delta 1(r)>0\%$. R1 is defined as the radius at which the refractive index delta of the core first reaches value of 0.05%, going radially outwardly from the centerline. Preferably, the core 420 contains substantially no fluorine, and more preferably the core 420 contains no fluorine. In some embodiments, the inner annular portion 530 preferably has a relative refractive index profile $\Delta 2(r)$ having a maximum absolute magnitude less than 0.05%, and $\Delta 2MAX<0.05\%$ and $\Delta 2MIN>-0.05\%$, and the depressed-index annular portion 550 begins where the relative refractive index of the cladding first reaches a value of less than −0.05%, going radially outwardly from the centerline. In some embodiments, the outer annular portion 560 has a relative refractive index profile $\Delta 4(r)$ having a maximum absolute magnitude less than 0.05%, and $\Delta 4MAX<0.05\%$ and $\Delta 4MIN>-0.05\%$, and the depressed-index annular portion 550 ends where the relative refractive index of the cladding first reaches a value of greater than −0.05%, going radially outwardly from the radius where $\Delta 3MIN$ is found.

Figure 8:
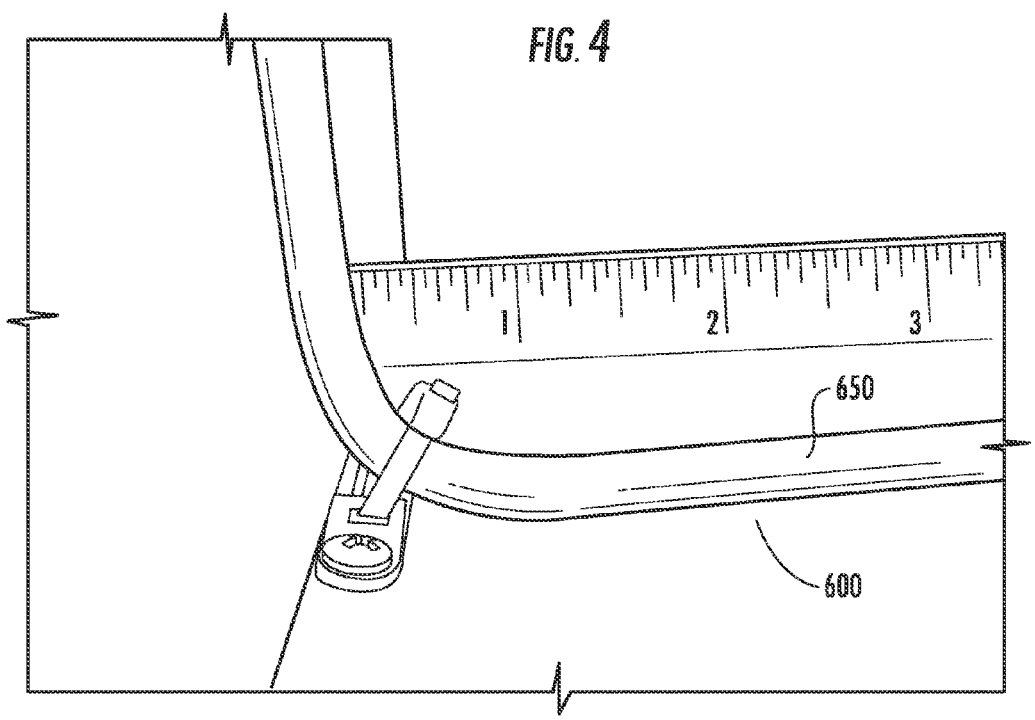
FIG. 8 illustrates a cable according to a third embodiment undergoing a corner tie down bend.

FIG. 8 illustrates a cable 600 according to a third embodiment of the present invention tied down to experience a 90 degree corner bend of approximately three-fourths inch (19 mm) radius. The cable 600 can be tied down to experience any number of corner bends. The cable 600 is generally similar to the cable 200 illustrated in FIG. 4, and incorporates 48 optical fibers of a configuration as discussed in the immediately preceding paragraphs. The cable 600 has a jacket 650, and includes 4 micromodules, each micromodule having 12 fibers.

Figure 9:
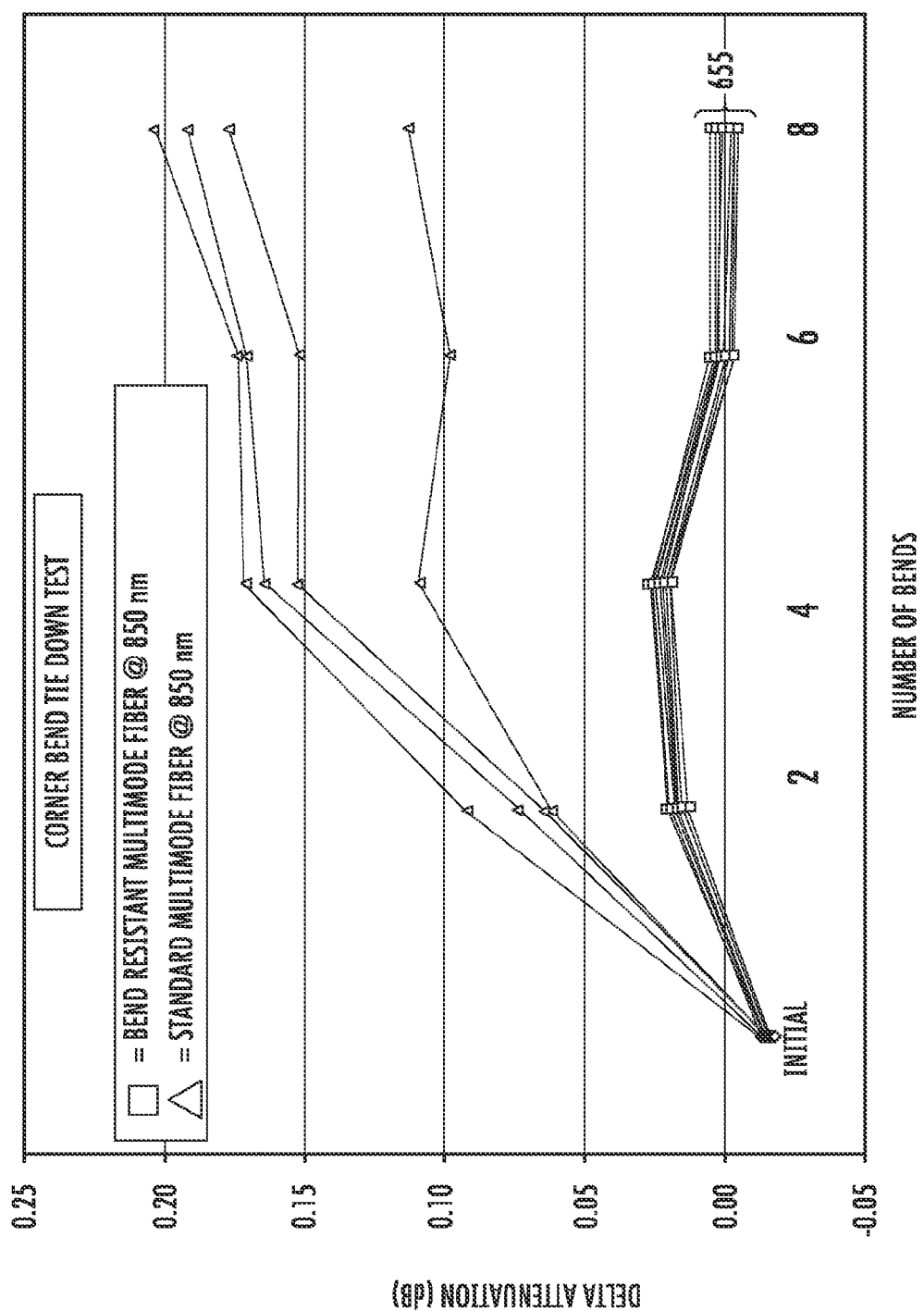
FIG. 9 is a plot of delta attenuation at 850 nm for the cable of FIG. 8 in a corner tie down bend test.

FIG. 9 is a plot of corner tie down delta attenuation data at 850 nm for the cable 600 undergoing varying numbers of corner bends, as shown in FIG. 8, of approximately one inch (25.4 mm) radius. Measured data points for the cable 600, of relatively low attenuation, are generally indicated by reference numeral 655. For reference purposes, higher delta attenuation data for similar cables utilizing alternative multimode fibers are also illustrated. As shown in FIG. 9, the delta attenuation values in group 655 over two, four, six and even eight bends are below 0.05 dB. More specifically, delta attenuation values for each of the data values in group 655 shown in FIG. 9 are below 0.05 dB, and even as low as 0.03 dB or less.

Figure 10:
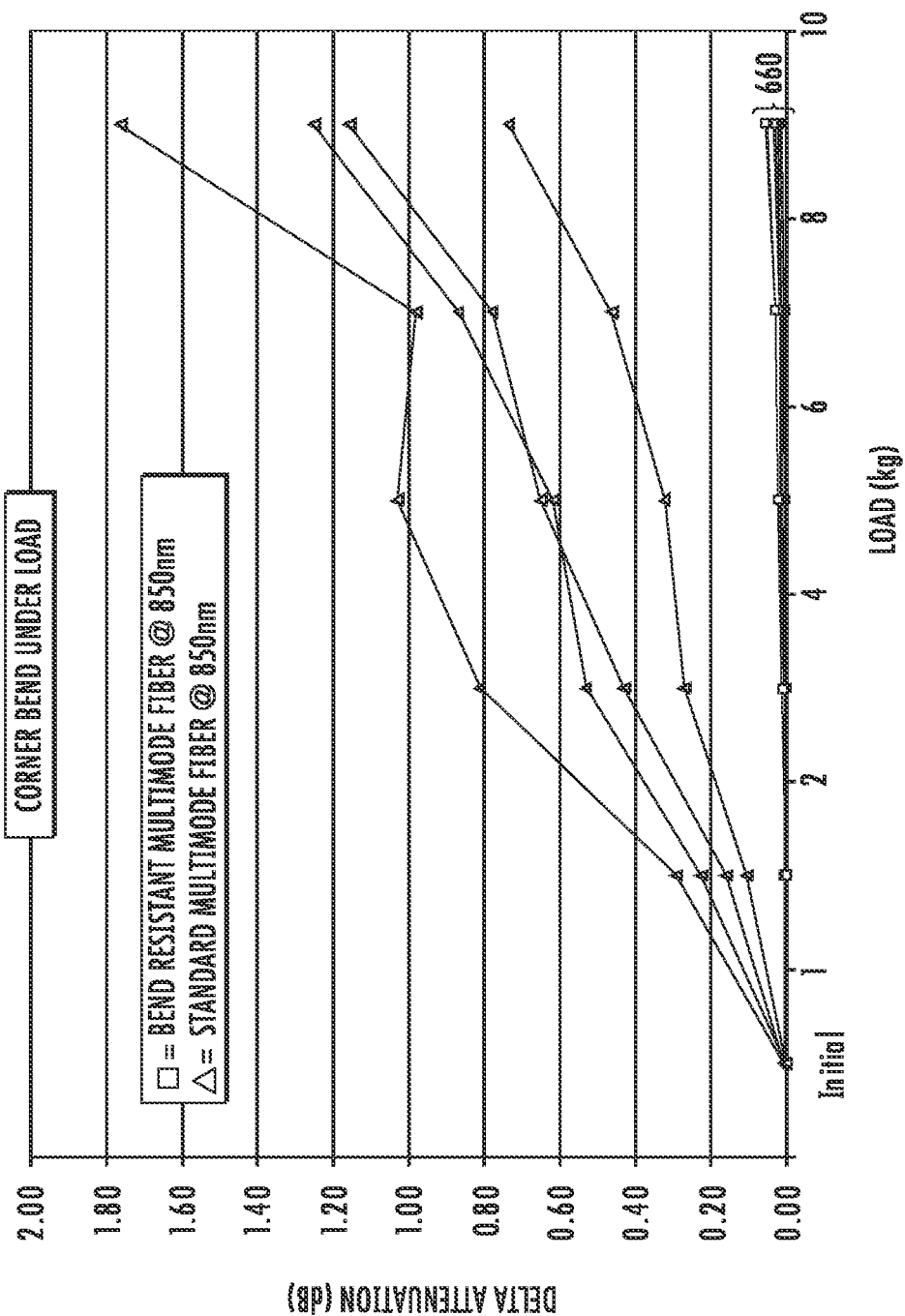
FIG. 10 is a plot of delta attenuation in a corner bend under load test.

Referring now to FIG. 10, the cable 600 can also be subjected to a corner bend under load. In a corner bend under load test, a weight is hung from an end of the cable that hangs over the corner of a surface. The corner may have a small radius, such as 1 mm. The other end of the cable is secured on the surface. Test delta attenuation data for the corner bend under load are shown in FIG. 10. The delta attenuation data, generally indicated by the bracket 660, for the cable 600 was much lower than similar cables utilizing alternative fibers. For loads of up to 8 kg, delta attenuation was less than about 0.05 dB. For loads of up to 6 kb, delta attenuation was less than about 0.03 dB.

Figure 11:
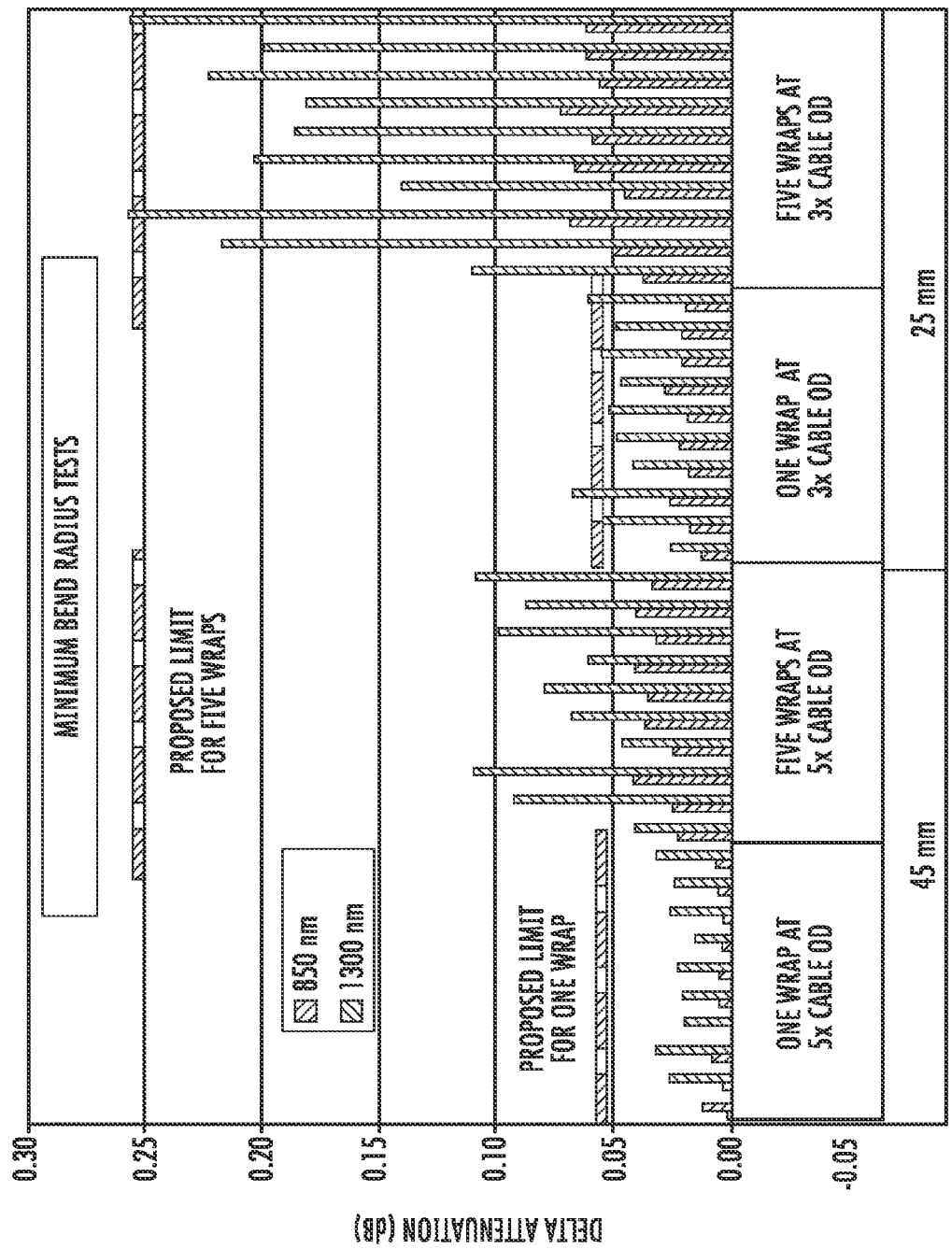
FIG. 11 is a plot of delta attenuation for one embodiment of the invention in small diameter mandrel wrap tests.

FIG. 11 is a plot of minimum bend radius test data for the cable 600 that contains twelve bend insensitive multimode optical fibers and has an outer diameter of 4.4 mm. The standard cable bend requirements is that the cable have low attenuation when wrapped around a mandrel that is ten times the cable outside diameter. FIG. 11 demonstrates that the cable 600 is capable of achieving bend diameters much smaller than the current 10× standard by having low attenuation at five times and even as low as three times the cable diameter. For example, for five wraps around a mandrel having a diameter of five times the cable diameter, delta attenuation due to the wraps is less than 0.15 dB. For one wrap around a mandrel having a diameter of three times the cable diameter, delta attenuation due to the wraps is less than 0.10 dB.

The present cable embodiments may utilize tensile yarns to form a separation layer between the modules and the outer jacket and thus prevent the modules from sticking to the jacket during extrusion of the jacket. The tensile yarns also provide strength to the cables. A preferred material for the tensile yarns is aramid (e.g., KEVLAR®), but other materials such as fiberglass yarn may also be used. The yarns may be stranded to improve cable performance. In the illustrated cables, the jackets may be sized such that the micromodules have a sufficient degree of lateral movement to reduce fiber stresses and optical attenuation when the cable is exposed to external forces such as tension, torsion, bending, or compression. The void fraction within the cable jackets may be about 56%.

In one particular set of parameters, cables according to the present embodiments may contain from four to twelve optical fibers within each micromodule. The breakout units 20 or the cables 200, 600 may contain from 2 to 24 micromodules within the cable for a range of fiber counts of 8 to 288. The dimensions of the micromodule may be adjusted based on the number of fibers within the module. The fibers may be loosely disposed within the module in an essentially parallel array. The fibers may be coated with a thin film of powder, such as chalk or talc, which forms a separation layer that prevents the fibers from sticking to the molten sheath material during extrusion. The outer jackets may be made of a fire retardant PVC material or a PVDF material to achieve a plenum burn performance rating. The cables may be further encased in an interlocking armor for enhanced crush resistance.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A micromodule cable, comprising:
   an outer jacket;
   a plurality of breakout units enclosed in the outer jacket, each breakout unit having a plurality of micromodules, a jacket enclosing the micromodules, and an aramid strain relief element adjacent to the jacket, with each micromodule having at least one bend resistant optical fiber and a polymer sheath surrounding the at least one bend resistant optical fiber, wherein the at least one bend resistant optical fiber comprises a glass cladding region surrounding and directly adjacent to a glass core region, wherein the cladding comprises a first annular portion having a lesser refractive index relative to a second annular portion of the cladding, wherein the first annular portion is interior to the second annular portion, and wherein the cladding is surrounded by a low modulus primary coating and a high modulus secondary coating; and
   a central strength member, the breakout units being arranged around the central strength member,
   wherein the cable satisfies the NFPA 262 plenum burn test,
   wherein each polymer sheath comprises polyvinyl chloride, and
   wherein when the cable is subjected to a corner bend tie down test at two tie down bend locations of 25.4 mm radius, delta attenuation at 850 nm in the cable due to the bend is less than 0.05 dB.

2. The micromodule cable of claim 1, wherein the at least one bend resistant optical fiber in the micromodules can be accessed by tearing the micromodule sheath with a user's fingers.

3. The micromodule cable of claim 2, wherein the polymer sheaths have a thickness in the range of 0.2 to 0.3 mm.

4. The micromodule cable of claim 1, wherein when subjected to a corner bend load of six kilograms, delta attenuation at 850 nm in the breakout units due to the load is less than 0.4 dB.

5. The micromodule cable of claim 1, wherein the core region of the at least one optical fiber has a 50 micron diameter which provides an overfilled bandwidth of greater than 1.5 GHz-km.

6. The micromodule cable of claim 5, wherein the core region contains substantially no fluorine.

7. The micromodule cable of claim 1, wherein the polyvinyl chloride is a highly-filled polyvinyl chloride.

* * * * *